United States Patent
Blais et al.

(10) Patent No.: US 11,461,887 B2
(45) Date of Patent: Oct. 4, 2022

(54) SYSTEM AND METHOD FOR INSPECTING WORKPIECES

(71) Applicant: PRATT & WHITNEY CANADA CORP., Longueuil (CA)

(72) Inventors: Mario Blais, Varennes (CA); Clement Drouin Laberge, Terrebonne (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 85 days.

(21) Appl. No.: 16/791,349

(22) Filed: Feb. 14, 2020

(65) Prior Publication Data
US 2021/0256673 A1    Aug. 19, 2021

(51) Int. Cl.
*G06T 7/00* (2017.01)
*G06T 5/50* (2006.01)
*G06T 7/70* (2017.01)

(52) U.S. Cl.
CPC ............... *G06T 7/001* (2013.01); *G06T 5/50* (2013.01); *G06T 7/70* (2017.01); *G06T 2207/20221* (2013.01)

(58) Field of Classification Search
CPC .............. G06T 7/001; G06T 7/70; G06T 5/50
USPC ......................................... 382/100, 141, 152
See application file for complete search history.

(56) References Cited

U.S. PATENT DOCUMENTS

| | | | |
|---|---|---|---|
| 6,701,001 B1 | 3/2004 | Kenneway et al. | |
| 10,445,873 B2 | 10/2019 | Szarski et al. | |
| 2007/0014467 A1* | 1/2007 | Bryll | G06K 9/4609 382/152 |
| 2012/0307041 A1* | 12/2012 | Fujiwara | G01N 21/8422 348/E5.049 |
| 2016/0334778 A1* | 11/2016 | Cope | G05B 19/401 |
| 2018/0330490 A1* | 11/2018 | Kido | G01N 21/8806 |

* cited by examiner

*Primary Examiner* — Ayodeji O Ayotunde
(74) *Attorney, Agent, or Firm* — Norton Rose Fulbright Canada LLP

(57) ABSTRACT

Methods, systems and devices for inspecting workpieces are described. The method comprises acquiring partial measurement data from a plurality of workpieces associated with a batch of workpieces; composing an inspection data set from the partial measurement data; comparing the inspection data set to a reference data set defining tolerances for the workpieces; and accepting and rejecting the batch of workpieces based on the comparing of the inspection data set to the reference data set.

20 Claims, 8 Drawing Sheets

SYSTEM AND METHOD FOR INSPECTING WORKPIECES

TECHNICAL FIELD

The present disclosure relates generally to inspection of workpieces.

BACKGROUND OF THE ART

There are various reasons which may cause a production tool to stop producing workpieces that are conform to defined tolerances. For this reason, the inspection of workpieces forms an integral part of the fabrication process.

Therefore, improvements are needed.

SUMMARY

In accordance with a broad aspect, there is provided a method for inspecting workpieces. The method comprises acquiring partial measurement data from a plurality of workpieces associated with a batch of workpieces; composing an inspection data set from the partial measurement data; comparing the inspection data set to a reference data set defining tolerances for the workpieces; and accepting and rejecting the batch of workpieces based on the comparing of the inspection data set to the reference data set.

In accordance with another broad aspect, there is provided an inspection management device. The device comprises a processing unit and a non-transitory computer-readable medium having stored thereon program code. The program code is executable by the processing unit for receiving partial measurement data acquired from a plurality of workpieces associated with a batch of workpieces; composing an inspection data set from the partial measurement data; comparing the inspection data set to a reference data set defining tolerances for the workpieces; and accepting and rejecting the batch of workpieces based on the comparing of the inspection data set to the reference data set.

In accordance with yet another broad aspect, there is provided an inspection station for inspecting workpieces. The inspection station comprises a data acquisition system for acquiring partial measurement data acquired from a plurality of workpieces associated with a batch of workpieces and an inspection management device. The inspection management device is configured for receiving partial measurement data acquired from a plurality of workpieces associated with a batch of workpieces; composing an inspection data set from the partial measurement data; comparing the inspection data set to a reference data set defining tolerances for the workpieces; and accepting and rejecting the batch of workpieces based on the comparing of the inspection data set to the reference data set.

Features of the systems, devices, and methods described herein may be used in various combinations, in accordance with the embodiments described herein. More particularly, any of the above features may be used together, in any combination.

BRIEF DESCRIPTION OF THE DRAWINGS

Reference is now made to the accompanying figures in which.

It will be noted that throughout the appended drawings, like features are identified by like reference numerals.

DETAILED DESCRIPTION

There are described methods and systems for inspecting workpieces produced from a production tool. The workpieces may be produced using a wide variety of techniques, such as but not limited to machining, injection molding, three-dimensional printing, and the like. In some embodiments, the workpiece is a component from a gas turbine engine, such as those used in aircraft. Example gas turbine engines include turboprop engines, turboshaft engines, turbofan engines, and the like. The workpiece may also be used in other industries and/or for other applications.

Figure 1:
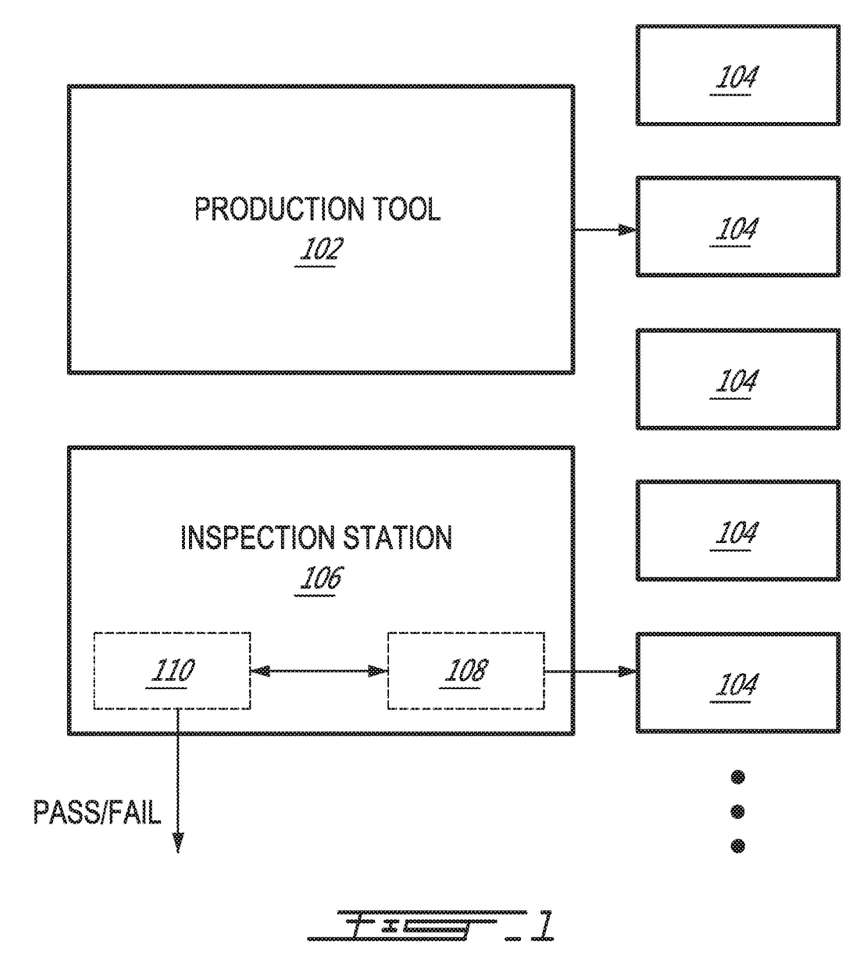
FIG. 1 is a block diagram showing an example production tool and inspection station.

With reference to FIG. 1, there is illustrated an example production tool 102 configured for producing workpieces 104. Once produced, the workpieces 104 are provided to an inspection station 106, where inspection is performed thereon. The workpieces 104 may be conveyed to the inspection station 106 on a conveyor. The workpieces 104 may also be carried to the inspection station 106, or transferred thereto using any automated or motorized instrument or equipment.

Once the workpieces 104 reach the inspection station 106, they undergo inspection. More specifically, inspection is performed on a population of parts produced with the same production parameters, also referred to herein as a batch or a lot. Acceptance of the workpieces 104 is based on a statistical basis by combining information obtained from the population of parts in order to meet the theoretical definition of a workpiece without measuring the entire surface of every workpiece.

Figure 2:
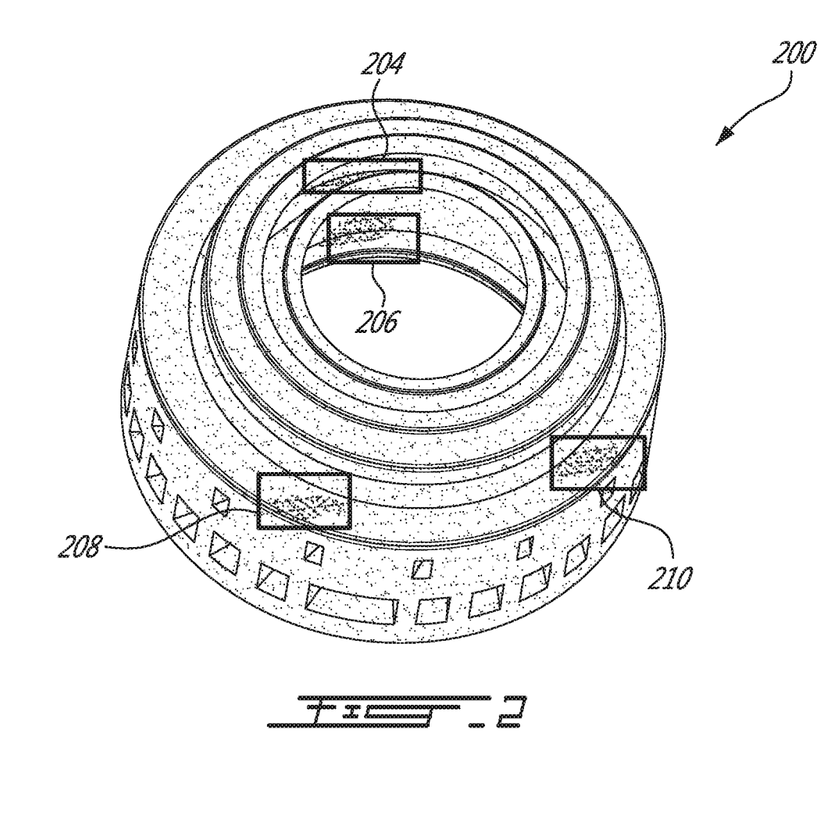
FIG. 2 is an example rendered image of a workpiece.

Inspection is performed based on partial measurement data. Indeed, it may be difficult to obtain complete measurement data for a given workpiece 104. Certain imaging techniques cannot acquire data from the entire surface of the workpiece 104. This may be due to the geometry of the workpiece 104, the physical limitations of the data acquisition system, the presence of particles on the workpiece, the difficulty in properly placing the workpiece on the data acquisition system, etc. An example is shown in FIG. 2, which illustrates a rendered image 200 of an example workpiece 104. The image 200 comprises locations 204, 206, where no data is acquired due to the geometry of the component 200. Locations 208, 210 are also shown to have artefacts, caused by dust particles on the workpiece 104 as data is acquired or simply a defect created by the data acquisition system. In order to avoid performing inspection of a workpiece 104 on an incomplete data set, an inspection data set is composed from partial measurement data obtained from a plurality of workpieces 104.

The inspection data set is compared to reference data defining one or more tolerance for the workpieces 104. Tolerances may include any manufacturing tolerances, such as but not limited to outside dimensions, thickness, external corner radii, length, straightness, twist, mass, and the like.

The reference data may include tolerances for any geometric parameters associated with the workpiece 104.

Figure 3:
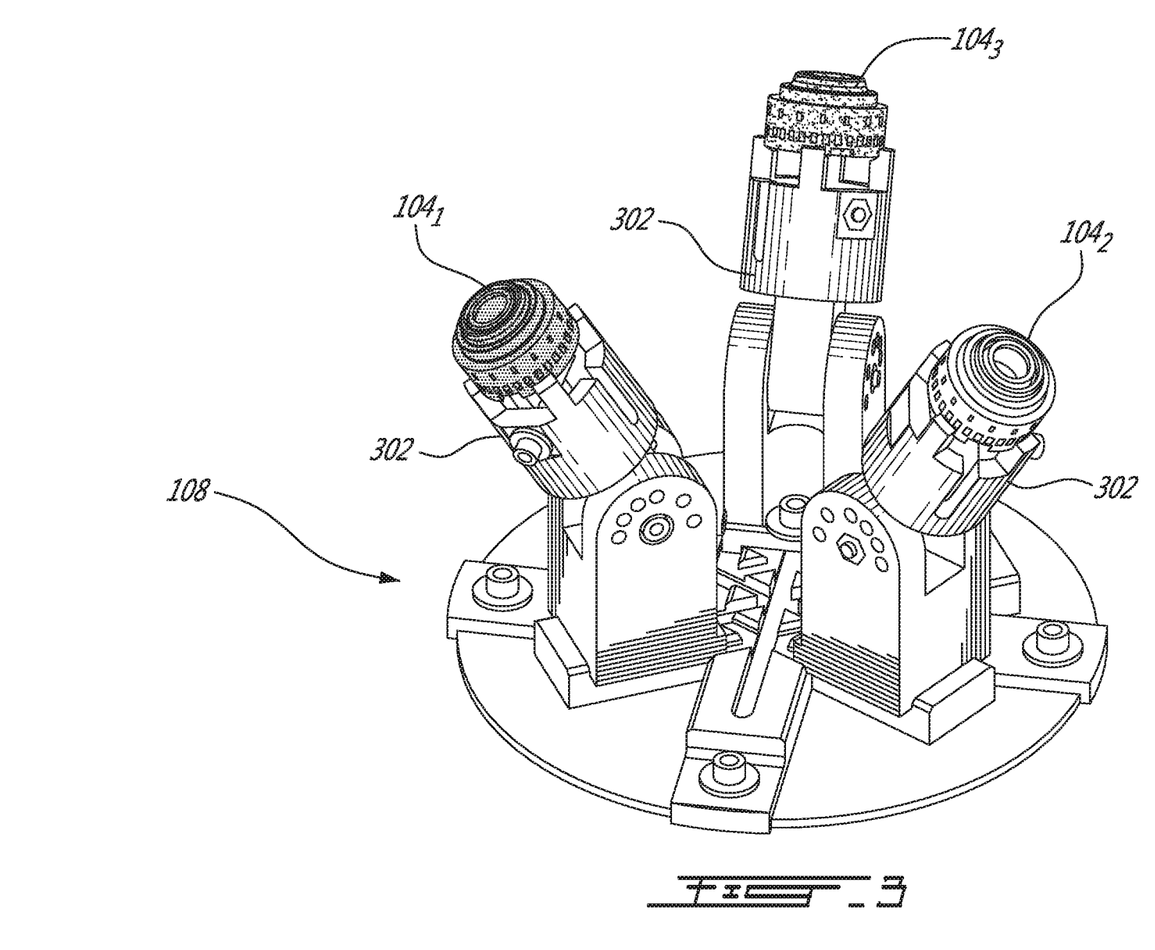
FIG. 3 is a schematic diagram of an example data acquisition device.

Referring back to FIG. 1, the partial measurement data is acquired from the workpieces 104 by sampling data points on the workpieces 104, using one or more data acquisition system 108. Various types of data acquisition systems 108 may be used, such as a coordinate-measuring machine (CMM), a line scanner, a computed tomography scanner, a white light 3D scanner, etc. In some embodiments, the data acquisition system 108 is an imaging system comprising a camera, an imaging lens, and an illumination source. An example embodiment for a data acquisition system 108 is shown in FIG. 3. A plurality of fixtures 302 can receive workpieces 104 for acquisition of the partial measurement data. More or less fixtures 302 may be provided for a given data acquisition system 108. In some embodiments, the fixtures are omitted and the partial measurement data is acquired with the workpieces 104 in a resting state on a surface. The partial measurement data may correspond to one or more images of the workpiece 104. The partial measurement data may also correspond to a point cloud of one or more surfaces of the workpiece 104. The point cloud may be directly rendered or converted to a polygon mesh, a triangle mesh model, a NURBS surface model, a CAD model, or the like, through surface reconstruction. The partial measurement data may be 2D or 3D.

The workpieces 104 may be placed on the data acquisition system 108 in a random or pseudo-random manner. In other words, precise alignment of the workpiece 104 is not required to obtain the partial measurement data. As seen in the example of FIG. 3, three workpieces $104_1$, $104_2$, $104_3$ are not aligned in any particular manner, and the orientation is different for each workpiece $104_1$, $104_2$, $104_3$. In some embodiments, the workpieces 104 are positioned differently with respect to a common axis. In some embodiments, the workpieces 104 are rotated about the common axis as the partial measurement data is acquired.

In some embodiments, it is desirable to vary the positioning of the workpieces 104 on the data acquisition system 108, for example by varying the orientation and/or positioning. This may provide complementary information from one workpiece 104 to another workpiece 104. For example, if the orientation of each workpiece 104 varies by 15°, then twenty-four workpieces will allow a full 360° to be captured. These values are for illustration purposes, other embodiments may also apply.

Referring back to FIG. 1, the partial measurement data as acquired by the data acquisition system 108 is provided to an inspection management device 110. In some embodiments, the inspection management device 110 may trigger data acquisition by the data acquisition system 108, once the workpiece 104 is ready. In some embodiments, the workpieces 104 are randomly or pseudo-randomly disposed on a conveyor and the data acquisition system 108 acquires the partial measurement data in an automated manner as the workpieces 104 are conveyed on the conveyor. Machine vision may be used to detect the presence of a workpiece 104 and trigger acquisition of the partial measurement data.

Figure 4A:
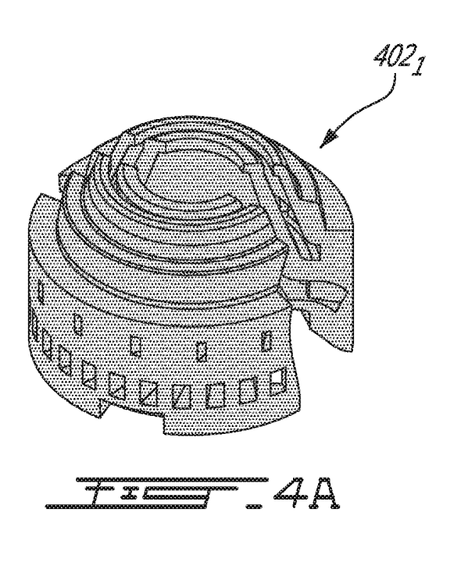
FIGS. 4A-4C are examples of partial measurement data sets.
Figure 4B:
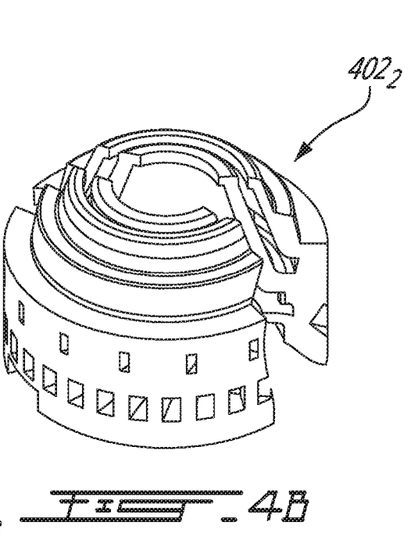
Figure 4C:
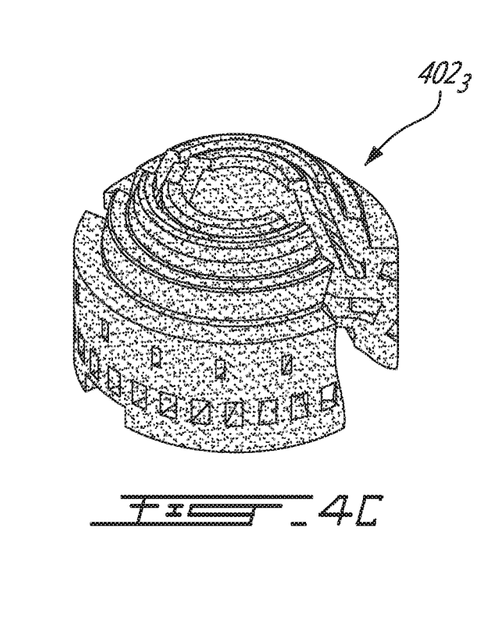

FIGS. 4A-4C illustrate examples of partial measurement data. FIG. 4A shows partial measurement data $402_1$ for workpiece $104_1$. FIG. 4B shows partial measurement data $402_2$ for workpiece $104_2$. FIG. 4C shows partial measurement data $402_3$ for workpiece $104_3$. The inspection management device 110 is configured for composing an inspection data set from the partial measurement data, by merging the partial measurement data $402_1$, $402_2$, $402_3$ together.

Figure 5A:
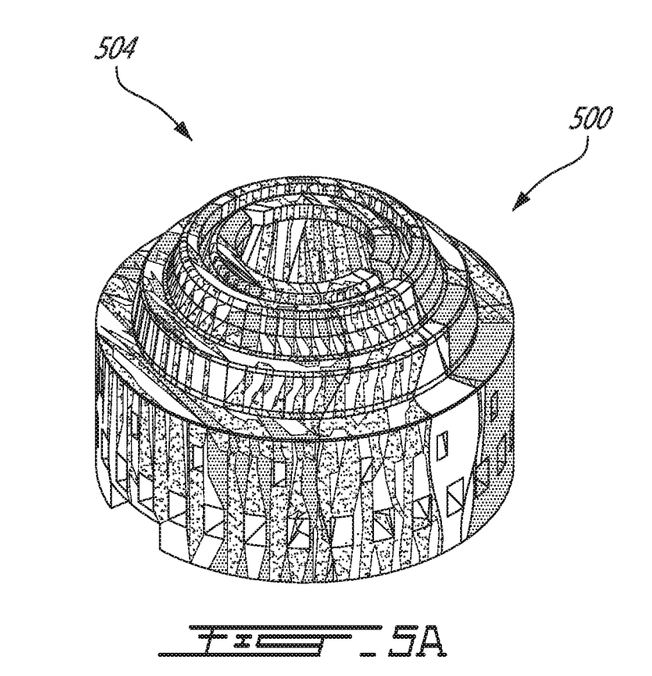
FIGS. 5A-5C are examples of inspection data sets.
Figure 5B:
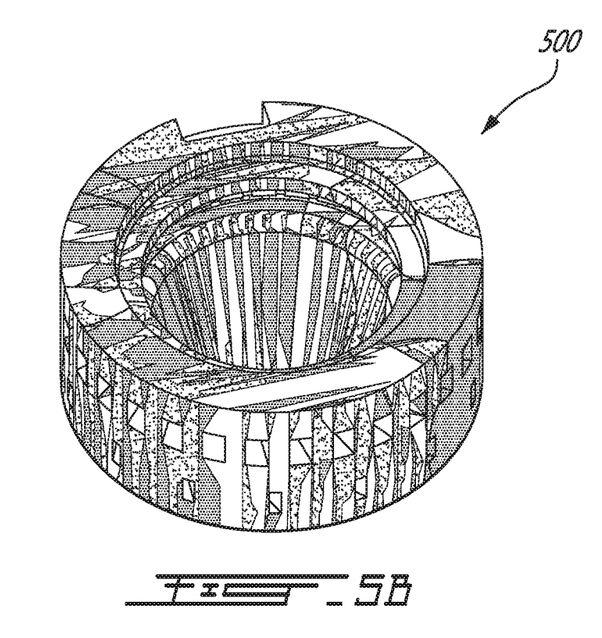
Figure 5C:
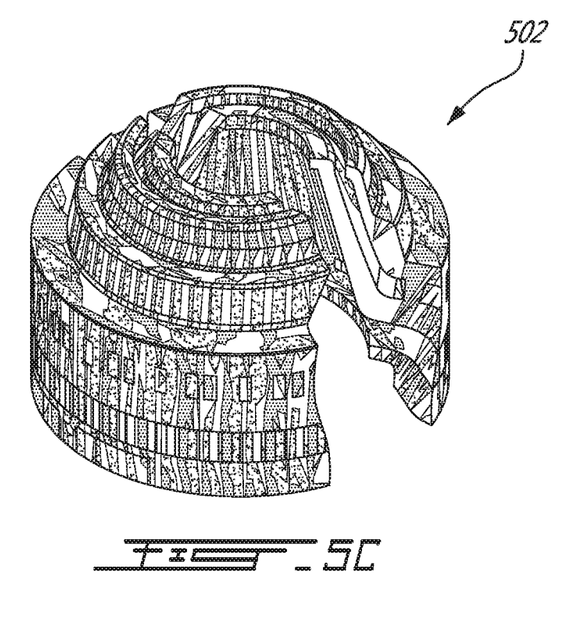

FIGS. 5A-5B illustrate an example inspection data set 500, generated by combining the partial measurement data $402_1$, $402_2$, $402_3$ from the different workpieces $104_1$, $104_2$, $104_3$. FIG. 5A illustrates a top view perspective, FIG. 5B illustrates a bottom view perspective. It will be understood that the example herewith uses three partial measurement data sets to obtain the inspection data set, but that more or less than three partial measurement data sets may be used. The greater the number of partial measurement data sets, the greater the accuracy of the inspection data set. In some embodiments, the inspection data set 500 is a complete volume to represent the workpiece 104, as illustrated in FIGS. 5A-5B. FIG. 5C shows an example where an inspection data set 502 forms less than a complete volume but more than each individual partial measurement data set $402_1$, $402_2$, $402_3$.

In some embodiments, generating the inspection data set from the partial measurement data sets comprises performing one or more manipulation on the partial measurement data sets in order to obtain the inspection data set. The partial measurement data sets may be manipulated before or after being combined or merged. For example, data manipulation may comprise rotating data sets in order to align certain features of the workpiece. Referring to the example of FIGS. 5A-5C, FIG. 5C is an example of the inspection data set 502 composed of the partial measurement data sets $402_1$, $402_2$, $402_3$ as merged without rotation, FIGS. 5A-5B are examples of the inspection data set 500 composed of the partial measurement data sets $402_1$, $402_2$, $402_3$ merged and rotated in order to align each data set $402_1$, $402_2$, $402_3$ relative to a center of the workpiece and the slot 504. Manipulation of the data may depend on the specific geometry of the workpiece 104. For example, a circular workpiece may involve rotation of the data sets whereas a square or rectangular workpiece may involve translations one or more axis, such as (x, y, z). Other embodiments may also apply, such as any combination of rotations, translations, reflections, and the like.

The inspection management device 110 compares the inspection data set 500, 502 to the reference data set defining tolerances for the workpiece 104 as produced, and accepts and rejects the population of workpieces based on the outcome of the comparison. For example, there may be a plurality of tolerances and the batch of parts is issued a "pass" only if all of the tolerances are met. In some embodiments, a pass/fail signal is issued for each tolerance of the reference data set, such that an operator may determine whether the batch is acceptable or not.

The comparison between the inspection data set and the reference data set may result in one or more error being defined, the error corresponding to the difference between a given parameter in the inspection data set and the given parameter in the reference data set. When the error reaches a threshold, the inspection management device 110 may issue a signal indicative that the batch of workpieces has failed inspection. When the error is below the threshold, the inspection management device 110 may issue a signal indicative that the batch of workpieces 104 has passed the inspection.

In some embodiments, the tolerances defined in the reference data set comprise a plurality of levels, such that the action resulting from the comparison depends on the level. An example is illustrated below in Table 1.

TABLE 1

| ERROR | LEVEL | ACTION |
|---|---|---|
| 0-0.5 | LEVEL 1 | PASS |
| 0.6-1.0 | LEVEL 2 | PASS with warning |
| 1.1+ | LEVEL 3 | FAIL |

Although three levels are shown in the example of Table 1, more or less than three levels may be used. Indeed, the tolerances in the reference data set may be composed of multiple levels, and different actions may be taken as a function of the error. The inspection of the workpieces 104 may thus be customized using actions other than only pass and fail. Warnings as issued may be audible, visual, text-based, or any other variant allowing an operator to recognize the status of the inspection.

The pass/fail assessment is performed on the basis of the inspection data set, which is composed of subsets of data acquired from multiple parts. In some embodiments, a fail may trigger individual inspection of the workpieces of a batch. The partial measurement data of a given workpiece may be used for individual inspection, or the workpiece may be inspected using a new set of data that is more complete, on the same data acquisition system 108 or a different one.

Figure 6:
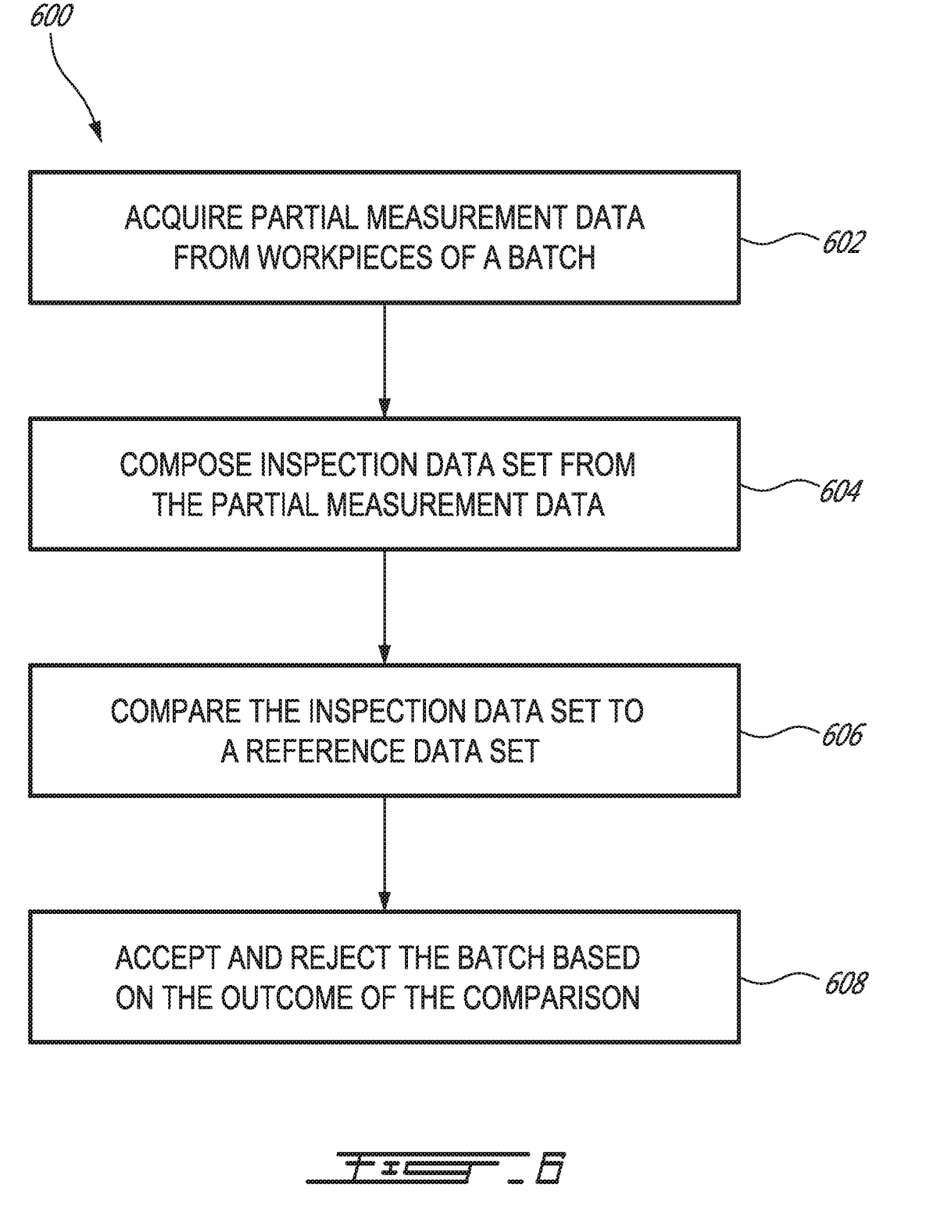
FIG. 6 is a flowchart of an example method for inspecting workpieces.

With reference to FIG. 6, there is illustrated an example method 600 for inspecting workpieces. In some embodiments, the method 600 is performed by the inspection management device 110. In some embodiments, the method 600 is performed by a combination of the inspection management device 110 and the data acquisition system 108.

At step 602, the partial measurement data is acquired from a plurality of workpieces associated with a batch of workpieces. In some embodiments, partial measurement data is acquired from all of the workpieces of a batch. Alternatively, partial measurement data is acquired from a subset of the workpiece of the batch. For example, partial measurement data may be acquired from every other workpiece, or every third workpiece. It will be understood that the more data is acquired, the greater the accuracy of the inspection. However, there may be a trade-off involved in terms of the costs associated with acquiring data from every workpiece of a batch vs only a subset of workpieces of a batch. It will also be understood that a batch may be composed of any number of workpieces. For example, a batch may refer to a set of five workpieces, ten workpieces, twenty workpieces, etc. Any grouping of workpieces for the purpose of inspection may be used.

At step 604, the inspection data set is composed from the partial measurement data obtained from the plurality of workpieces. The partial measurement data may be manipulated in order to form the inspection data set, such as by rotation, translation, reflection, and the like, before or after merging of the data sets. The inspection data set may correspond to a complete volume, a partial volume, a surface, a plurality of surfaces, or any other subset of the workpiece. For example, if the features of interest for inspection are all found on a same surface of the workpiece, only that surface is generated by merging the partial measurement data into the inspection data set. Other embodiments may also apply.

At step 606, the inspection data set is compared to a reference data set. At step 608, the batch of workpieces is accepted or rejected on the basis of the outcome of the comparison. Various different actions may be taken with regards to accepting or rejecting the batch. For example, a warning signal may be issued in certain circumstances. Individual inspection of the workpieces from the batch may be triggered by a rejection of the batch. Other embodiments may also apply.

Figure 7:
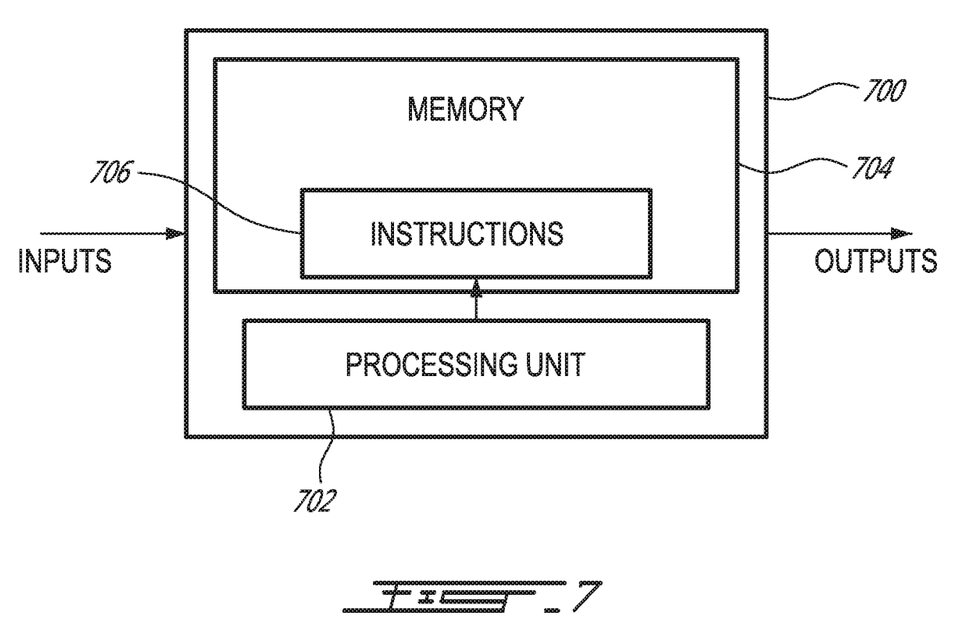
FIG. 7 is a block diagram of an example computing device for performing the method of FIG. 6.

With reference to FIG. 7, an example of a computing device 700 is illustrated. The inspection management device 110 may be implemented with one or more of the computing devices 700. The computing device 700 comprises a processing unit 702 and a memory 704 which has stored therein computer-executable instructions 706. The processing unit 702 may comprise any suitable devices configured to implement the method 600 or any variants thereof, such that instructions 706, when executed by the computing device 700 or other programmable apparatus, may cause the functions/acts/steps performed as part of the method 700 to be executed. The processing unit 702 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 704 may comprise any suitable known or other machine-readable storage medium. The memory 704 may comprise non-transitory computer readable storage medium, for example, but not limited to, an electronic, magnetic, optical, electromagnetic, infrared, or semiconductor system, apparatus, or device, or any suitable combination of the foregoing. The memory 704 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 704 may comprise any storage means (e.g., devices) suitable for retrievably storing machine-readable instructions 706 executable by processing unit 702.

The methods, devices, and systems for inspecting workpieces described herein may be implemented in a high level procedural or object oriented programming or scripting language, or a combination thereof, to communicate with or assist in the operation of a computer system, for example the computing device 700. Alternatively, the methods, devices, and systems for inspecting workpieces may be implemented in assembly or machine language. The language may be a compiled or interpreted language. Program code for implementing the methods, devices, and systems for inspecting workpieces may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods, devices, and systems for inspecting workpieces may also be considered to be implemented by way of a non-transitory computer-readable storage medium having a computer program stored thereon. The computer program may comprise computer-readable instructions which cause a computer, or more specifically the processing unit 702 of the computing device 700, to operate in a specific and predefined manner to perform the functions described herein, for example those described in the method 600.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, partial measurement data and/or inspection data collected over time may be used to set the tolerances of the reference data set for inspection of other batches of workpieces having similar production parameters. Yet further modifications could be implemented by a person of ordinary skill in the art in view of the present disclosure, which modifications would be within the scope of the present technology.

The invention claimed is:

1. A method for inspecting workpieces, the method comprising:
   acquiring partial measurement data from a plurality of workpieces associated with a batch of workpieces, the partial measurement data acquired by imaging less than an entire surface of the workpieces in the batch, with at least one of a position and an orientation of the workpieces being varied between workpieces for data acquisition;
   composing an inspection data set from the partial measurement data acquired from the plurality of workpieces;
   comparing the inspection data set to a reference data set defining tolerances for the workpieces; and
   accepting and rejecting the batch of workpieces based on the comparing of the inspection data set to the reference data set.

2. The method of claim 1, wherein composing the inspection data set comprises generating a complete volume to represent the workpieces.

3. The method of claim 1, wherein composing the inspection data set comprises merging the partial measurement data from the plurality of workpieces and manipulating the partial measurement data by applying at least one of a translation, a rotation, and a reflection to the partial measurement data.

4. The method of claim 3, wherein manipulating the partial measurement data comprises aligning at least one feature from the workpieces from different sets of the partial measurement data.

5. The method of claim 1, wherein acquiring the partial measurement data comprises sampling data points on the workpieces.

6. The method of claim 1, wherein acquiring the partial measurement data comprises acquiring at least one image of at least one surface of the workpieces in the batch.

7. The method of claim 1, wherein acquiring the partial measurement data comprises acquiring the partial measurement data from the workpieces randomly positioned for data acquisition.

8. The method of claim 1, wherein acquiring partial measurement data comprises acquiring partial measurement data from a subset of the workpieces in the batch of workpieces.

9. An inspection management device comprising:
   a processing unit; and
   a non-transitory computer-readable medium having stored thereon program code executable by the processing unit for:
      receiving partial measurement data acquired from a plurality of workpieces associated with a batch of workpieces, the partial measurement data acquired by imaging less than an entire surface of the workpieces in the batch, with at least one of a position and an orientation of the workpieces being varied between workpieces for data acquisition;
      composing an inspection data set from the partial measurement data acquired from the plurality of workpieces;
      comparing the inspection data set to a reference data set defining tolerances for the workpieces; and
      accepting and rejecting the batch of workpieces based on the comparing of the inspection data set to the reference data set.

10. The device of claim 1, further comprising acquiring the partial measurement data.

11. The device of claim 9, wherein composing the inspection data set comprises generating a complete volume to represent the workpieces.

12. The device of claim 9, wherein composing the inspection data set comprises merging the partial measurement data from the plurality of workpieces and manipulating the partial measurement data by applying at least one of a translation, a rotation, and a reflection to the partial measurement data.

13. The device of claim 12, wherein manipulating the partial measurement data comprises aligning at least one feature from the workpieces from different sets of the partial measurement data.

14. The device of claim 10, wherein acquiring the partial measurement data comprises sampling data points on the workpieces.

15. The device of claim 10, wherein acquiring the partial measurement data comprises acquiring at least one image of at least one surface of the workpieces in the batch.

16. The device of claim 10, wherein acquiring the partial measurement data comprises acquiring the partial measurement data from the workpieces randomly positioned for data acquisition.

17. The device of claim 10, wherein acquiring partial measurement data comprises acquiring partial measurement data from a subset of the workpieces in the batch of workpieces.

18. An inspection station for inspecting workpieces, the inspection station comprising:
   a data acquisition system for acquiring partial measurement data from a plurality of workpieces associated with a batch of workpieces, the partial measurement data acquired by imaging less than an entire surface of the workpieces in the batch, with at least one of a position and an orientation of the workpieces being varied between workpieces for data acquisition; and
   an inspection management device configured for:
      receiving the partial measurement data;
      composing an inspection data set from the partial measurement data acquired from the plurality of workpieces;
      comparing the inspection data set to a reference data set defining tolerances for the workpieces; and accepting and rejecting the batch of workpieces based on the comparing of the inspection data set to the reference data set.

19. The inspection station of claim 18, wherein composing the inspection data set comprises generating a complete volume to represent the workpieces.

20. The inspection station of claim 18, wherein composing the inspection data set comprises merging the partial measurement data from the plurality of workpieces and manipulating the partial measurement data by applying at least one of a translation, a rotation, and a reflection to the partial measurement data.

\* \* \* \* \*